(12) United States Patent
Balmakhtar et al.

(10) Patent No.: US 12,699,570 B2
(45) Date of Patent: Aug. 4, 2026

(54) EXECUTABLE COMMAND SECURITY

(71) Applicant: T-MOBILE INNOVATIONS LLC,
Overland Park, KS (US)

(72) Inventors: Marouane Balmakhtar, Fairfax, VA
(US); Lyle Walter Paczkowski,
Mission Hills, KS (US)

(73) Assignee: T-MOBILE INNOVATIONS LLC,
Overland Park, KS (US)

( * ) Notice: Subject to any disclaimer, the term of this
patent is extended or adjusted under 35
U.S.C. 154(b) by 122 days.

(21) Appl. No.: 18/179,554

(22) Filed: Mar. 7, 2023

(65) Prior Publication Data

US 2024/0303084 A1      Sep. 12, 2024

(51) Int. Cl.
G06F 9/38          (2018.01)
G06F 8/72          (2018.01)
(52) U.S. Cl.
CPC .............. G06F 9/3879 (2013.01); G06F 8/72
(2013.01)
(58) Field of Classification Search
CPC ............................... G06F 12/02; H04W 48/18
See application file for complete search history.

(56) References Cited

U.S. PATENT DOCUMENTS

| | | | | |
|---|---|---|---|---|
| 6,032,248 | A * | 2/2000 | Curry ..................... | G11C 16/08 |
| | | | | 712/E9.035 |
| 7,650,645 | B1 | 1/2010 | Langendorf et al. | |

| | | | | |
|---|---|---|---|---|
| 8,862,853 | B2 | 10/2014 | Sahita et al. | |
| 9,043,615 | B2 | 5/2015 | Fullerton et al. | |
| 9,223,982 | B2 | 12/2015 | Adams et al. | |
| 9,317,708 | B2 | 4/2016 | Lee et al. | |
| 9,967,745 | B2 | 5/2018 | Marquardt et al. | |
| 10,064,240 | B2 | 8/2018 | Stern | |
| 10,075,540 | B2 | 9/2018 | Rajagopal et al. | |
| 2013/0275688 | A1 * | 10/2013 | Luo ......................... | G06F 12/02 |
| | | | | 711/154 |
| 2015/0006403 | A1 | 1/2015 | Shear et al. | |
| 2016/0154744 | A1 * | 6/2016 | Zheng ..................... | H04L 9/088 |
| | | | | 713/193 |
| 2018/0322941 | A1 * | 11/2018 | Krishnan ............... | G16H 10/40 |
| 2019/0236031 | A1 * | 8/2019 | Kim ......................... | G06F 12/14 |
| 2022/0114245 | A1 * | 4/2022 | Krishan .................. | G06F 21/32 |
| 2022/0264275 | A1 * | 8/2022 | Vamanan ................ | H04W 8/12 |
| 2024/0188024 | A1 * | 6/2024 | Won ....................... | H04W 48/18 |

* cited by examiner

*Primary Examiner* — Getente A Yimer

(57)          ABSTRACT

A user communication device or another type of electronic
device handles executable commands. The user communi-
cation device stores individual code segments of the execut-
able commands in isolated memories. The user communi-
cation device identifies individual digital certificates for the
individual code segments. The user communication device
validates the individual digital certificates for the individual
code segments with individual cryptographic keys for the
individual code segments. In response to successful valida-
tion, the user communication device retrieves the individual
code segments from the isolated memories. The user com-
munication device assembles the executable commands
from the retrieved individual code segments. The user
communication device executes the assembled executable
commands. The assembled executable commands enable the
user communication device to access networks, servers,
databases, content, and/or some other items.

20 Claims, 9 Drawing Sheets

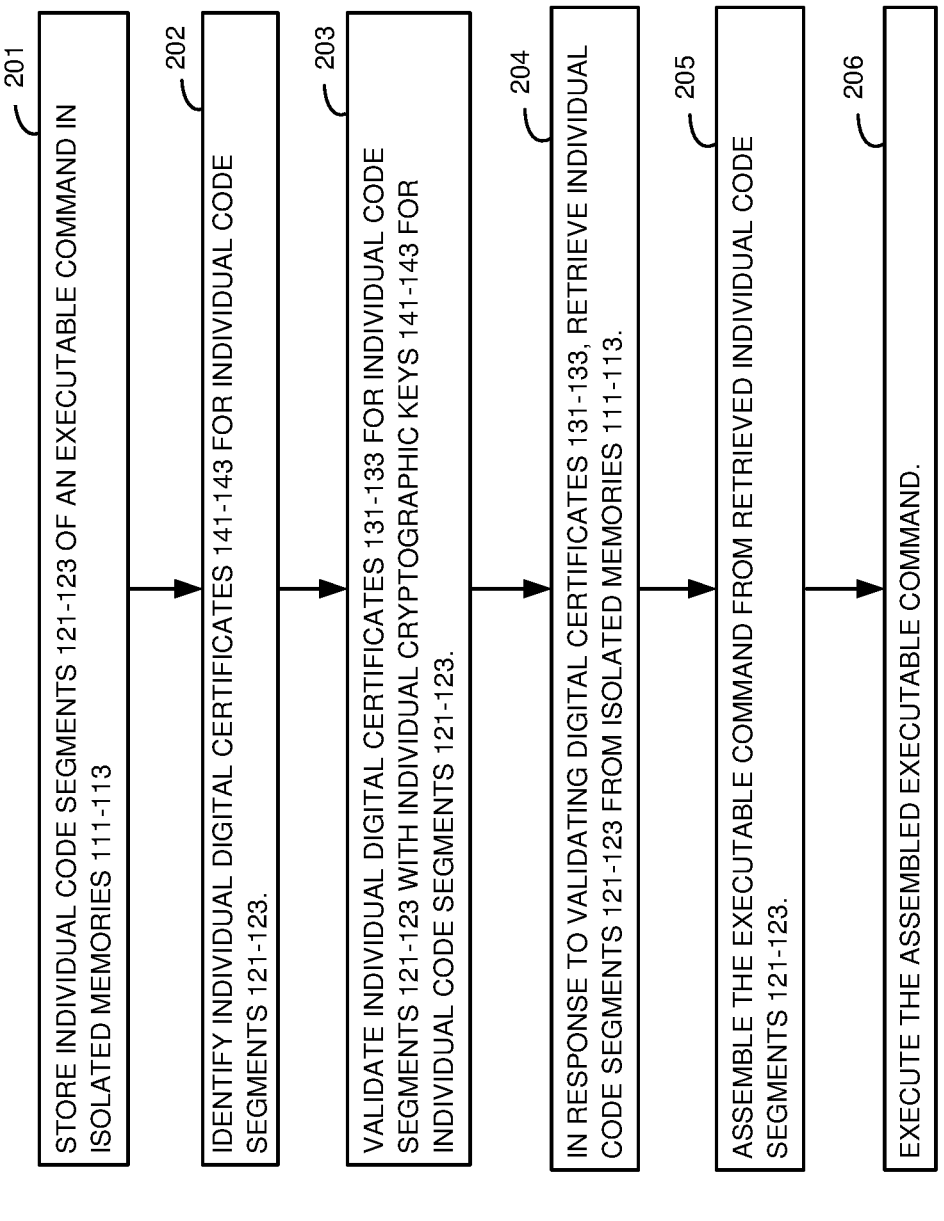

201

STORE INDIVIDUAL CODE SEGMENTS 121-123 OF AN EXECUTABLE COMMAND IN ISOLATED MEMORIES 111-113

202

IDENTIFY INDIVIDUAL DIGITAL CERTIFICATES 141-143 FOR INDIVIDUAL CODE SEGMENTS 121-123.

203

VALIDATE INDIVIDUAL DIGITAL CERTIFICATES 131-133 FOR INDIVIDUAL CODE SEGMENTS 121-123 WITH INDIVIDUAL CRYPTOGRAPHIC KEYS 141-143 FOR INDIVIDUAL CODE SEGMENTS 121-123.

204

IN RESPONSE TO VALIDATING DIGITAL CERTIFICATES 131-133, RETRIEVE INDIVIDUAL CODE SEGMENTS 121-123 FROM ISOLATED MEMORIES 111-113.

205

ASSEMBLE THE EXECUTABLE COMMAND FROM RETRIEVED INDIVIDUAL CODE SEGMENTS 121-123.

206

EXECUTE THE ASSEMBLED EXECUTABLE COMMAND.

FIGURE 2

EXECUTABLE COMMAND SECURITY

TECHNICAL BACKGROUND

In electronic devices, processing circuitry executes executable commands to access networks, servers, databases, content, and other items. The executable commands comprise machine-readable object code that may comprise scripts, interfaces, access codes, and other instructions. The object code that makes up the executable commands typically comprise binary strings of ones and zeros. These binary strings are executed by the processing circuitry to drive access to networks, servers, databases, content, and other items.

These executable commands may be stolen and used by nefarious actors to improperly access the networks, servers, databases, content, and other items. In some cases, access to the memory circuitry to read legitimate data allows a thief to improperly read other executable commands that are also stored in the memory circuitry. In addition, the executable commands may be inadvertently read and provided from the memory circuitry to innocent actors who do not realize the error but still use the executable commands to improperly access the networks, servers, databases, content, and other items. The memory circuitry may be protected by an access code, but failure to secure the access code exposes all of the executable commands in the memory circuitry to theft or improper use.

Unfortunately, user communication devices do not effectively protect their executable commands. Moreover, the user communication devices do not feature efficient access to their executable commands without undo security measures that bog down the resulting processing task. Thus, access to the networks, servers, databases, content, and other items is not effectively secured in an efficient manner.

TECHNICAL OVERVIEW

In some examples, a user communication device handles executable commands. The user communication device stores individual code segments of the executable commands in isolated memories. The user communication device identifies individual digital certificates for the individual code segments. The user communication device validates the individual digital certificates for the individual code segments with individual cryptographic keys for the individual code segments. In response to successful validation, the user communication device retrieves the individual code segments from the isolated memories. The user communication device assembles the executable commands from the retrieved individual code segments. The user communication device executes the assembled executable commands. The assembled executable commands enable the user communication device to access networks, servers, databases, content, and/or some other items.

In some examples, processing circuitry uses an executable command. The processing circuitry transfers individual code segments of the executable command and storage instructions to memory circuitry. The storage instructions direct the memory circuitry to store individual code segments of the executable command in different isolated memories. The memory circuitry receives the individual code segments of the executable command and the storage instructions. In response, the memory circuitry stores the individual code segments of the executable command in the different isolated memories. To obtain the executable command, the processing circuitry identifies individual digital certificates for the individual code segments. The processing circuitry validates the individual digital certificates for the individual code segments with individual cryptographic keys for the individual code segments. In response to the successful validation, the processing circuitry transfers retrieval instructions to the memory circuitry that direct the memory circuitry to transfer the individual code segments of the executable command from the different isolated memories to the processing circuitry. The memory circuitry receives the retrieval instructions from the processing circuitry, and in response, transfers the individual code segments of the executable command from the different isolated memories to the processing circuitry. The processing circuitry receives the individual code segments of the executable command from the memory circuitry. The processing circuitry assembles the executable command from the received individual code segments. The processing circuitry then executes the assembled executable command.

DESCRIPTION OF THE DRAWINGS

FIG. 2 illustrates an exemplary operation to handle an executable command.

DETAILED DESCRIPTION

Figure 1:
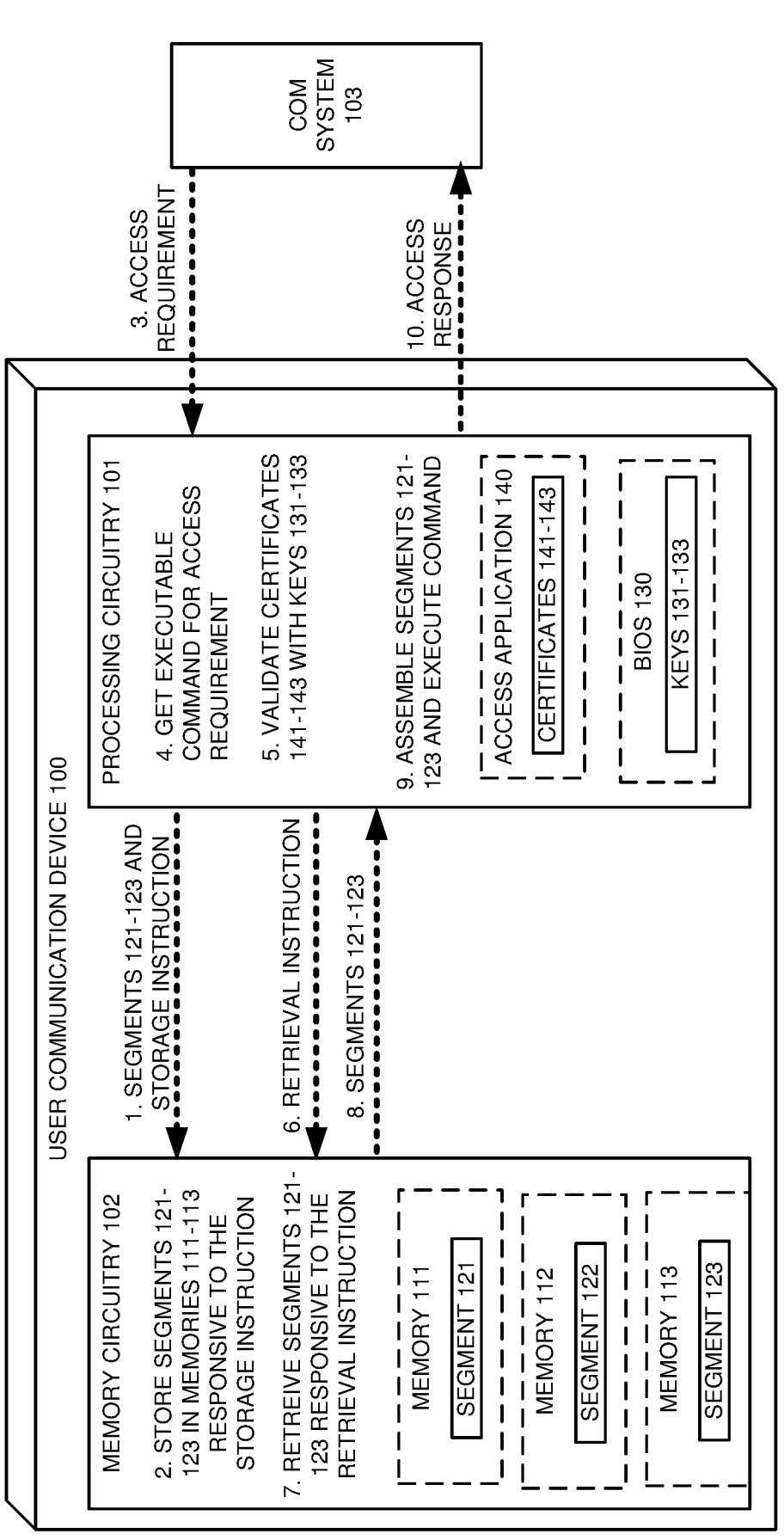
FIG. 1 illustrates an exemplary user communication device to handle an executable command.

FIG. 1 illustrates exemplary user communication device 100 to handle an executable command. The executable command comprises object code that is machine-readable. An exemplary executable command comprises a string of binary ones and zeros that is written in a machine language. Some executable commands comprise Application Programming Interfaces (APIs) that invoke specific functionalities—especially the ability for different applications to communicate.

User communication device 100 comprises processing circuitry 101 and memory circuitry 102. Processing circuitry 101 comprises Basic Input/Output System (BIOS) 130 that has cryptographic keys 131-133 and access application 140 that has digital certificates 141-143. Memory circuitry 102 comprises isolated memories 111-113 that respectively store executable command segments 121-123. The memory isolation prevents reading from one of memories 111-113 during access to another one of memories 111-113. When reading one of code segments from isolated memories 111-113, processing circuitry 101 will not read any other code segments in any other memories. Processing circuitry 101 will only read one of code segments 121-123 from one of memories 111-113 when the digital certificate for the individual code segment has been validated with a cryptographic key. Processing circuitry 101 and memory circuitry 102 are depicted in user communication device 100 in this example, but in other examples, processing circuitry 101 and memory circuitry 102 could be deployed in another electronic apparatus that is not a user communication device. In addition, user communication device 100 has been restricted for clarity and would typically include additional components, circuitry, and memory.

Various examples of system operation and configuration are described herein. In some examples, user communication device 100 operates as follows. In a first operation, processing circuitry 101 transfers code segments 121-123 and a storage instruction to memory circuitry 102. Code segments 121-123 comprise individual portions of an executable command, and the executable command is inoperable if only some of its code segments are used. In a second operation and in response to the storage instruction, memory circuitry 102 stores code segment 121 in memory 111, stores code segment 122 in memory 112, and stores code segment 123 in memory 113. Thus, code segments 121-123 are isolated from one another by isolated memories 111-113.

In a third operation, processing circuitry 101 executes access application 140 to receive an access requirement from communication system 103. In a fourth operation, processing circuitry 101 executes access application 140 to identify the executable command that is needed to respond to the access requirement along with code segments 121-123, keys 131-133, and certificates 141-143. In a fifth operation, processing circuitry 101 executes BIOS 130 and access application 140 to validate digital certificate 141 with cryptographic key 131, validate digital certificate 142 with cryptographic key 132, and validate digital certificate 143 with cryptographic key 133. For example, digital certificate 143 may comprise a data string that is encrypted with a private key for code segment 123, and cryptographic key 133 to validate code segment 123 may comprise a public key that is paired with the private key.

In a sixth operation and in response to the key validation, processing circuitry 101 transfers a retrieval instruction for individual code segments 121-123 to memory circuitry 102. Processing circuitry 101 will not retrieve any individual code segments that fail their individual validation, and the lack of one code segment renders the executable command inoperable. In a seventh operation, memory circuitry 102 retrieves individual code segments 121-123 responsive to the retrieval instruction. In an eighth operation, memory circuitry 102 transfers code segments 121-123 to processing circuitry 101 responsive to the retrieval instruction. In a ninth operation, processing circuitry 101 assembles the executable command from the retrieved individual code segments 121-123. Processing circuitry 101 processes the executable command for access application 140. In a tenth operation, processing circuitry 101 responsively transfers an access response to communication system 103. After the successful access response, user communication device 100 may now use communication system 103.

Advantageously, user communication device 100 effectively protects its executable commands. Moreover, user communication device 100 features efficient access to its executable commands without undo security measure that bog down the resulting processing task. Thus, access to communication system 103 or other items is effectively secured in an efficient manner.

User communication device 100 comprises a computer, phone, controller, and/or some other apparatus with communication circuitry. Processing circuitry 101 comprises a microprocessor, software, memory, transceivers, bus circuitry, and/or some other data processing components, The microprocessor comprises a Digital Signal Processor (DSP), Central Processing Unit (CPU), Graphical Processing Unit (GPU), Application-Specific Integrated Circuit (ASIC), and/or some other data processing hardware. Memory 102 comprises a Random Access Memory (RAM), flash circuitry, disk drive, and/or some other type of data storage.

FIG. 2 illustrates an exemplary operation of user communication device 100 to handle an executable command. User communication device 100 stores code segment 121 in memory 111, stores code segment 122 in memory 112, and stores code segment 123 in memory 113 (201). User communication device 100 identifies individual digital certificates for individual code segments 121-123 (202). User communication device 100 validates individual digital certificates 141-143 for individual code segments 121-123 with individual cryptographic keys 131-133 for individual code segments 121-123 (203). User communication device 100 will not retrieve any individual code segments 121-123 that fail this validation-which renders the executable command inoperable. In response to successful validation, user communication device 100 retrieves individual code segments 121-123 from isolated memories 111-113 (204). User communication device 100 assembles the executable command from retrieved individual code segments 121-123 (205). User communication device 100 executes the executable command (206).

Figure 3:
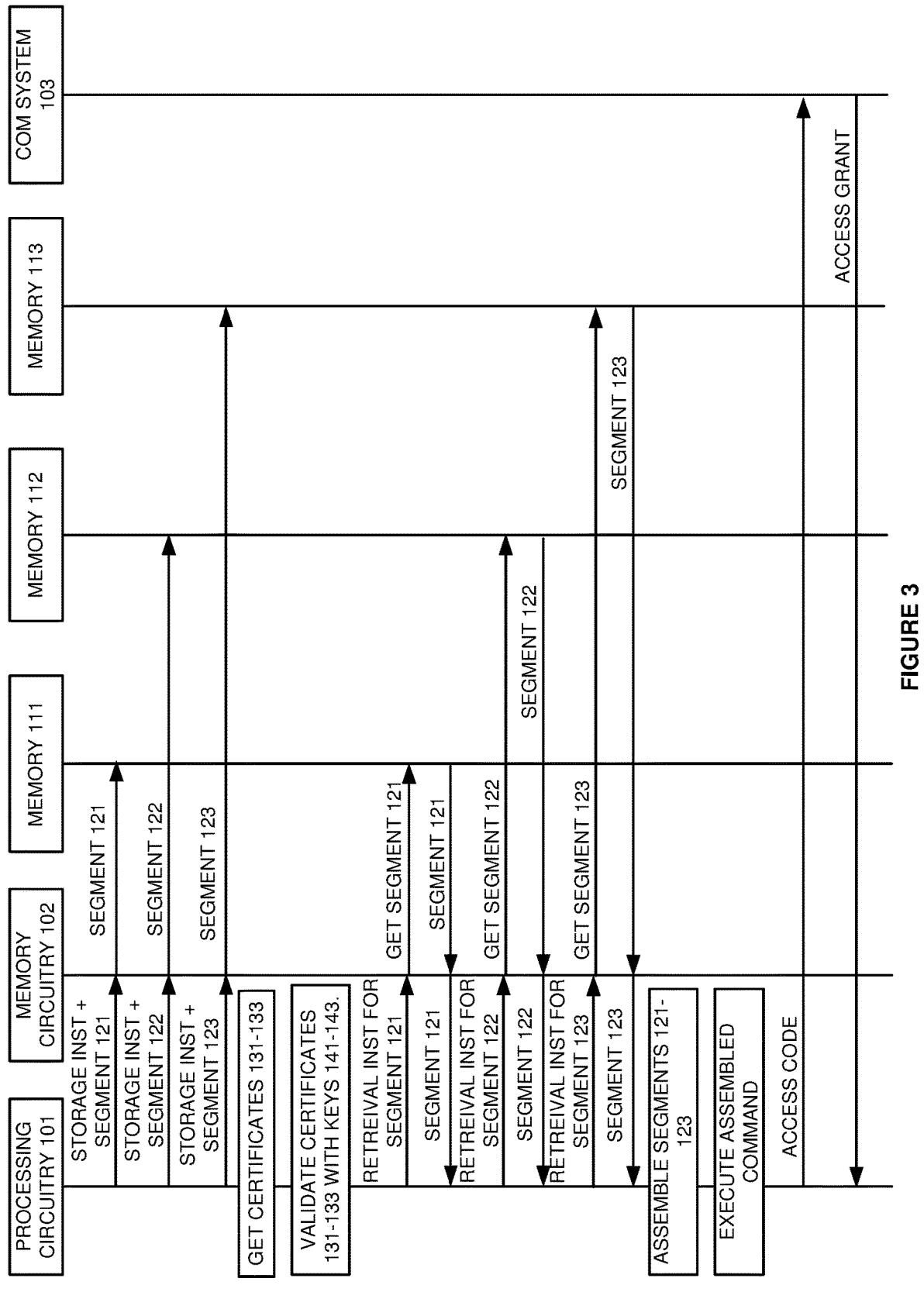
FIG. 3 illustrates an exemplary operation of the user communication device to handle an executable command.

FIG. 3 illustrates an exemplary operation of user communication device 100 to handle an executable command. The operation may vary in other examples. Processing circuitry 101 transfers a storage instruction and code segment 121 to memory circuitry 102. Memory circuitry 102 writes code segment 121 to isolated memory 111. Processing circuitry 101 transfers a storage instruction and code segment 122 to memory circuitry 102. Memory circuitry 102 writes code segment 122 to isolated memory 112. Processing circuitry 101 transfers a storage instruction and code segment 123 to memory circuitry 103. Memory circuitry 103 writes code segment 123 to isolated memory 113. Individual code segments 101-103 can only be accessed by gaining access to their individual isolated memories 111-113. For example, code segment 121 cannot be read by using access to isolated memories 112-113.

Processing circuitry 101 identifies the need to get the executable command from memory circuitry 102. To get the executable command from memory circuitry 102, processing circuitry 101 individually validates digital certificates 131-133 with respective cryptographic keys 141-143. For example, processing circuitry 101 decrypts digital certificate 132 with cryptographic key 142 to access code segment 122, and processing circuitry 101 will not access code segment 122 unless digital certificate 132 is validated through successful decryption.

Processing circuitry 101 transfers a retrieval instruction for code segment 121 to memory circuitry 102. Memory circuitry 102 gets code segment 121 from isolated memory 111 in response to the retrieval instruction. Memory circuitry 102 transfers code segment 121 to processing circuitry 101. Processing circuitry 101 transfers a retrieval instruction for code segment 122 to memory circuitry 102. Memory circuitry 102 gets code segment 122 from isolated memory 112 in response to the retrieval instruction. Memory circuitry 102 transfers code segment 122 to processing circuitry 101. Processing circuitry 101 transfers a retrieval instruction for code segment 123 to memory circuitry 102. Memory circuitry 102 gets code segment 123 from isolated memory 113 in response to the retrieval instruction. Memory circuitry 102 transfers code segment 123 to processing circuitry 101.

Processing circuitry 101 assembles the executable command from code segments 121-123. Processing circuitry 101 processes the executable command to transfer an access code to communication system 103. Communication system 103 grants network access to user communication device 100 in response to the access code.

Figure 4:
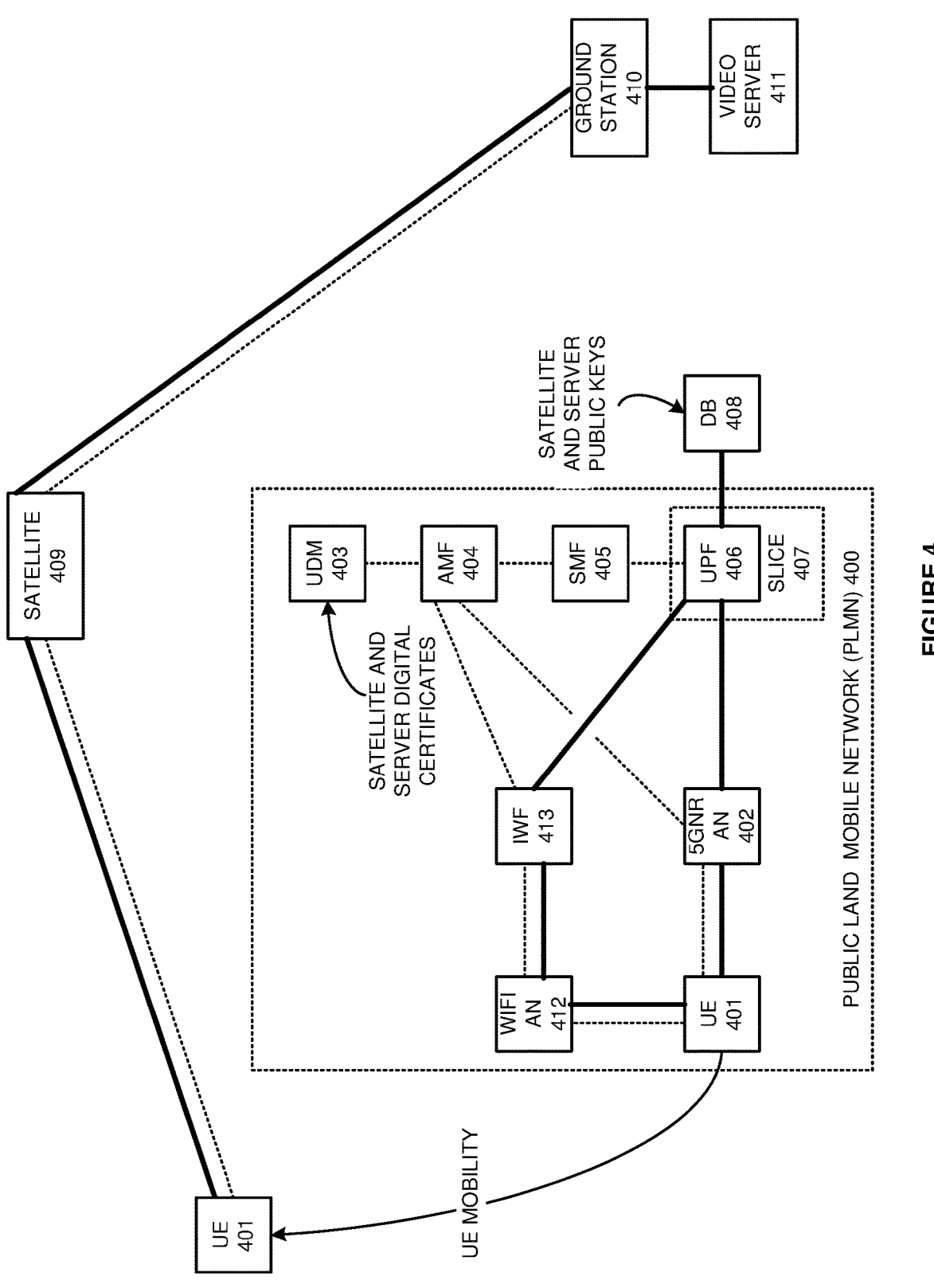
FIG. 4 illustrates an exemplary Public Land Mobile Network (PLMN) to handle an executable command.

FIG. 4 illustrates exemplary Public Land Mobile Network (PLMN) 400 to handle an executable command. PLMN 400 comprises User Equipment (UE) 401, Fifth Generation New Radio Access Node (5GNR AN) 402, Unified Data Management (UDM) 403, Access and Mobility Management Function (AMF) 404, Session Management Function (SMF) 405, User Plane Function (UPF) 406, Wireless Fidelity (WIFI) AN 412, and Interworking Function (IWF) 413. PLMN 400 comprises a wireless communication network that is licensed by the Federal Communications Commission (FCC) and that broadcasts a corresponding PLMN identifier.

In this example, network slice 407 comprises UPF 406, but a network slice may comprise other network functions in other examples. For example, network slice 407 could include an SMF, application server, and/or some other network elements. PLMN 400 comprises an example of communication system 103, although system 103 may differ. UE 401 comprises an example of user communication device 100, although device 100 may differ. On FIG. 4, signaling links are depicted with dotted lines and user data links are depicted by solid lines.

UE 401 uses executable commands to access PLMN 400, slice 407, satellite 409, and video server 411. UE 401 stores individual code segments for these executable commands in individual isolated memories. The operating system in UE 401 is configured with digital certificates and public keys to access network slice 407 in PLMN 400. To access satellite 409 and video server 411, UE 401 uses PLMN 400 and slice 407 to obtain additional digital certificates in UDM 403 and additional public keys in key database (DB) 408. Satellite 409 comprises a wireless communication apparatus that is in earth orbit.

UE 401 identifies the need to get the executable commands to access PLMN 400 and slice 407. To get these executable commands, the operating system in UE 401 validates the associated digital certificates with their corresponding public keys. UE 401 will not access individual code segments unless their individual digital certificates are properly validated. UE 401 assembles the executable commands from their retrieved code segments and executes the assembled executable commands. The executed commands drive UE 401 to access 5GNR AN 402 and register with AMF 404 and/or the executed commands drive UE 401 to access WIFI AN 412 and IWF 413 to register with AMF 404. In response to successful access using these code segments, AMF 404 retrieves UE context from UDM 403. The UE context includes digital certificates for code segments to access satellite 409 and video server 411.

AMF 404 and SMF 405 develop more UE context for a data session over slice 407 which includes UPF 406. AMF 404 transfers this UE context to 5GNR AN 402 and UE 401. AMF 404 may transfer UE context to IWF 413. SMF 405 transfer the UE context to UPF 406 in network slice 407. UE 401 uses the data session to access key database 408 and retrieve public keys for access to satellite 409 and video server 411.

UE 401 then moves out of range of PLMN 400 to capture live video at a remote site. UE 401 identifies the need to get the executable commands to access satellite 409 and video server 411. To get these executable commands, UE 401 validates the associated digital certificates from UDM 403 with their corresponding public keys from database 408. The operating system in UE 401 will not access individual code segments unless their individual digital certificates are properly validated. UE 401 assembles the executable commands from their retrieved code segments. UE 401 executes the assembled executable commands. The executed commands drive UE 401 to access satellite 409 and register with video server 411 over satellite 409 and ground station 410. In response to successful access, UE 401 transfers live video to video server 411 over satellite 409 and ground station 410.

Non-Public Networks (NPNs) comprise private Third Generation Partnership Project (3GPP) data networks. UE 401 may get code segments to assemble executable commands to access NPNs in a similar manner to its access to PLMN 400 as described herein.

Figure 5:
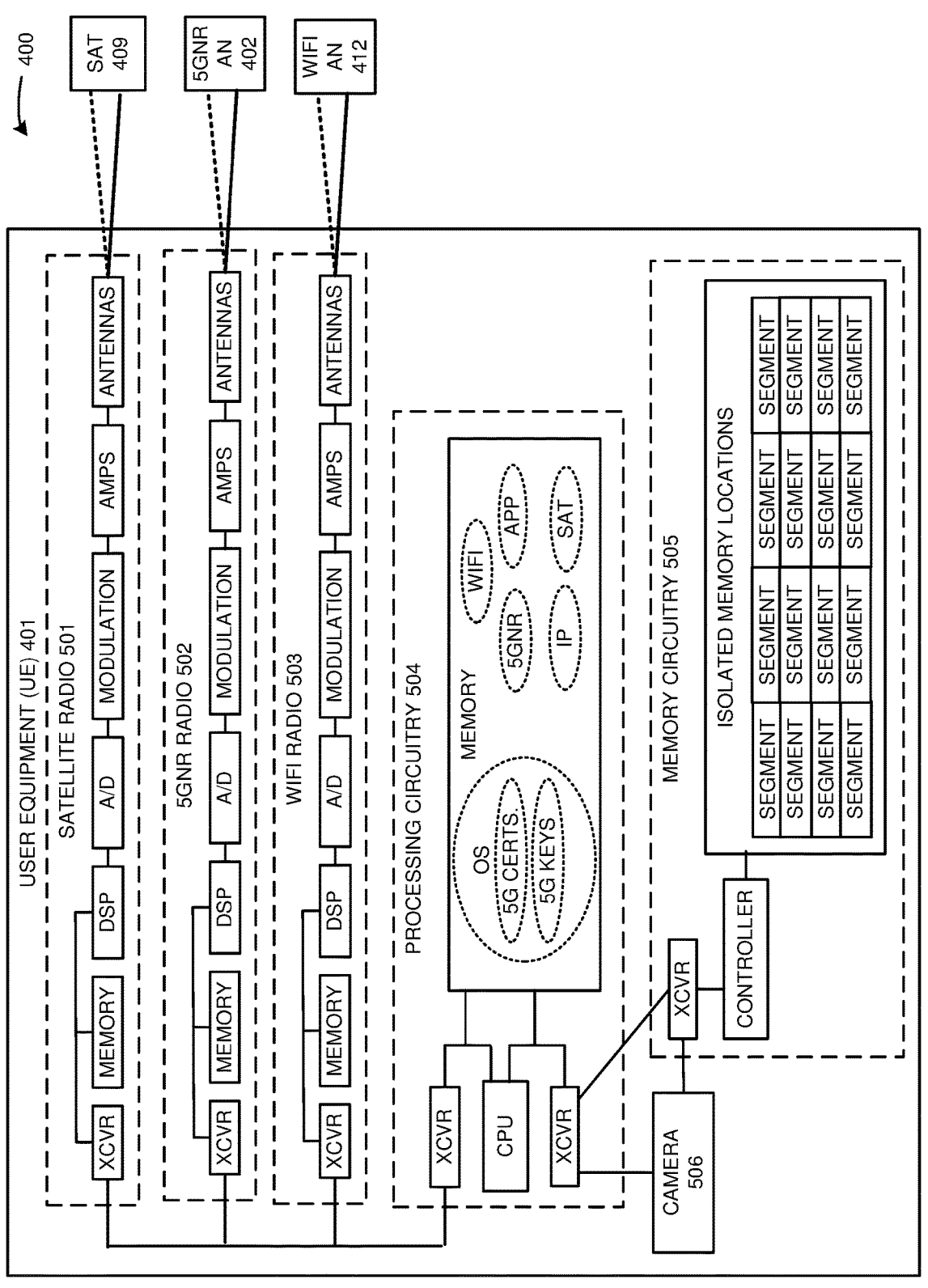
FIG. 5 illustrates an exemplary wireless User Equipment (UE) in the PLMN to handle an executable command.

FIG. 5 illustrates exemplary wireless User Equipment (UE) 401 in PLMN 400 to handle an executable command. UE 401 represents an example of user communication device 100, although device 100 may differ. UE 401 comprises satellite radio 501, 5GNR radio 502, WIFI radio 503, processing circuitry 504, memory circuitry 505, and camera 506. Radios 501-503 comprise antennas, amplifiers, filters, modulation, analog-to-digital interfaces, DSPs, memories, and transceivers that are coupled over bus circuitry. Processing circuitry 504 comprises CPU, memory, and transceivers (XCVRs) that are coupled over bus circuitry. The memory in processing circuitry 504 stores software like an Operating System (OS), 5GNR application (5GNR), WIFI application (WIFI), satellite application (SAT), Internet Protocol application (IP), and video application (APP). The OS has 5G digital certificates (certs.) and 5G public keys for PLMN and slice access. Memory circuitry 505 comprises transceivers, a controller, and isolated memory locations that store individual code segments for executable commands.

The antennas in satellite radio 501 exchange satellite signals with satellite 409. The antennas in 5GNR radio 502 exchange 5GNR signals with 5GNR AN 402. The antennas in WIFI radio 503 exchange WIFI signals with WIFI AN 412. Transceivers in radios 501-503 are coupled to transceivers in processing circuitry 504. Transceivers in processing circuitry 504 are coupled to transceivers in memory circuitry 505 and camera 506. In processing circuitry 504, the CPU retrieves the OS and applications from its memory and executes the OS and applications to direct the operation of UE 401 as described herein. In particular, processing circuitry 504 uses executable commands to access PLMN 400, slice 407, satellite 409, and video server 411. Memory circuitry 505 stores code segments for these executable commands in isolated memory locations in memory circuitry 505.

Processing circuitry 504 identifies the need to get the executable commands to access PLMN 400 and slice 407. To get these executable commands, the operating system in processing circuitry 504 validates the individual 5G digital certificates with their individual 5G public keys. The operating system in processing circuitry 504 will not access an individual code segment unless its individual digital certificates is properly validated. The operating system in processing circuitry 504 requests the code segments from the controller in memory circuitry 505, and the controller in memory circuitry 505 transfers the requested code segments to the operating system in processing circuitry 504. The operating system in processing circuitry 504 assembles the executable commands from their code segments. The operating system in processing circuitry 504 directs the CPU execute the assembled executable commands. The executed
commands drive the operating system in processing circuitry
504 to access 5GNR AN 402 and register with AMF 404
over 5GNR radio 502, and/or the executed commands may
drive the operating system in processing circuitry 504 to
access WIFI AN 412 and IWF 413 to register with AMF 404
over WIFI radio 503. In response to successful access using
the code segments, the operating system in processing
circuitry 504 receives digital certificates for access to sat-
ellite 409 and video server 411. The operating system in
processing circuitry 504 receives UE context for a data
session with database 408 over 5GNR radio 502, 5GNR AN
402, and UPF 406 in network slice 407, and or the operating
system in processing circuitry 504 may receive UE context
for a data session with database 408 over WIFI radio 503,
WIFI AN 412, IWF 413, and UPF 406 in network slice 407.
The operating system in processing circuitry 504 uses the
data session to access database 408 and retrieve the public
keys for access to satellite 409 and video server 411.

UE 401 then moves out of range of PLMN 400 to capture
live video at a remote site. The operating system in pro-
cessing circuitry 504 identifies the need to get the executable
commands to access satellite 409 and video server 411. To
get these executable commands, the operating system in
processing circuitry 504 validates the individual digital
certificates from UDM 403 with their corresponding indi-
vidual public keys from database 408. The operating system
in processing circuitry 504 will not access the individual
code segments unless their individual digital certificates are
properly validated. The operating system in processing
circuitry 504 retrieves code segments from their isolated
memory locations in memory circuitry 505. The operating
system in processing circuitry 504 assembles the executable
commands from their code segments. The operating system
in processing circuitry 504 drives the CPU to execute the
assembled executable commands. The executed commands
drive the operating system in processing circuitry 504 to
access satellite 409 over satellite radio 501 and to register
with video server 411 over satellite radio 501, satellite 409,
and ground station 410. In response to successful access
using the code segments, the operating system in processing
circuitry 504 transfers the live video from camera 506 to
video server 411 over satellite radio 501, satellite 409, and
ground station 410.

Figure 6:
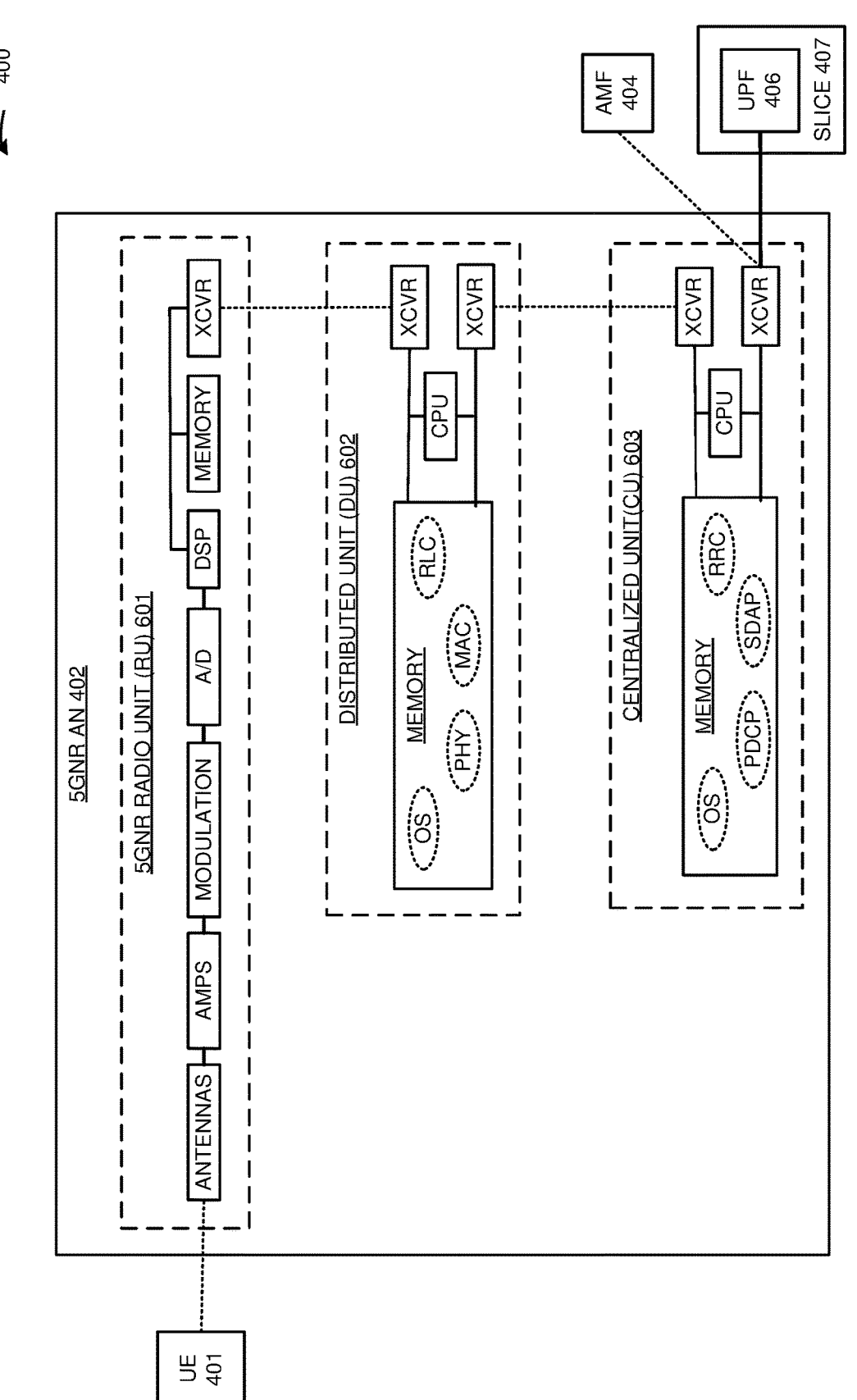
FIG. 6 illustrates an exemplary 5GNR Access Node (AN) in the PLMN to handle an executable command.

FIG. 6 illustrates exemplary 5GNR Access Node (AN)
402 in PLMN 400. 5GNR AN 402 comprises and example
of communication system 103, although communication
system 103 may differ. 5GNR AN 402 comprises 5GNR
Radio Unit (RU) 601, Distributed Unit (DU) 602, and
Centralized Unit (CU) 603. 5GNR RU 601 comprises anten-
nas, amplifiers, filters, modulation, analog-to-digital inter-
faces, DSP, memory, radio applications, and transceivers
that are coupled over bus circuitry. DU 602 comprises
memory, CPU, user interfaces and components, and trans-
ceivers that are coupled over bus circuitry. The memory in
DU 602 stores operating system and 5GNR network appli-
cations for Physical Layer (PHY), Media Access Control
(MAC), and Radio Link Control (RLC). CU 603 comprises
memory, CPU, and transceivers that are coupled over bus
circuitry. The memory in CU 603 stores an operating system
and 5GNR network applications for Packet Data Conver-
gence Protocol (PDCP), Service Data Adaption Protocol
(SDAP), and Radio Resource Control (RRC). The antennas
in 5GNR RU 601 are wirelessly coupled to UE 401 over
5GNR links. Transceivers in 5GNR RU 601 are coupled to
transceivers in DU 602. Transceivers in DU 602 are coupled
to transceivers in CU 603. Transceivers in CU 603 are coupled AMF 425 and UPF 423. The DSP and CPU in RU
601, DU 602, and CU 603 execute the radio applications,
operating systems, and network applications to exchange
data and signaling with UE 401, AMF 404, and UPF 406 as
described herein.

Figure 7:
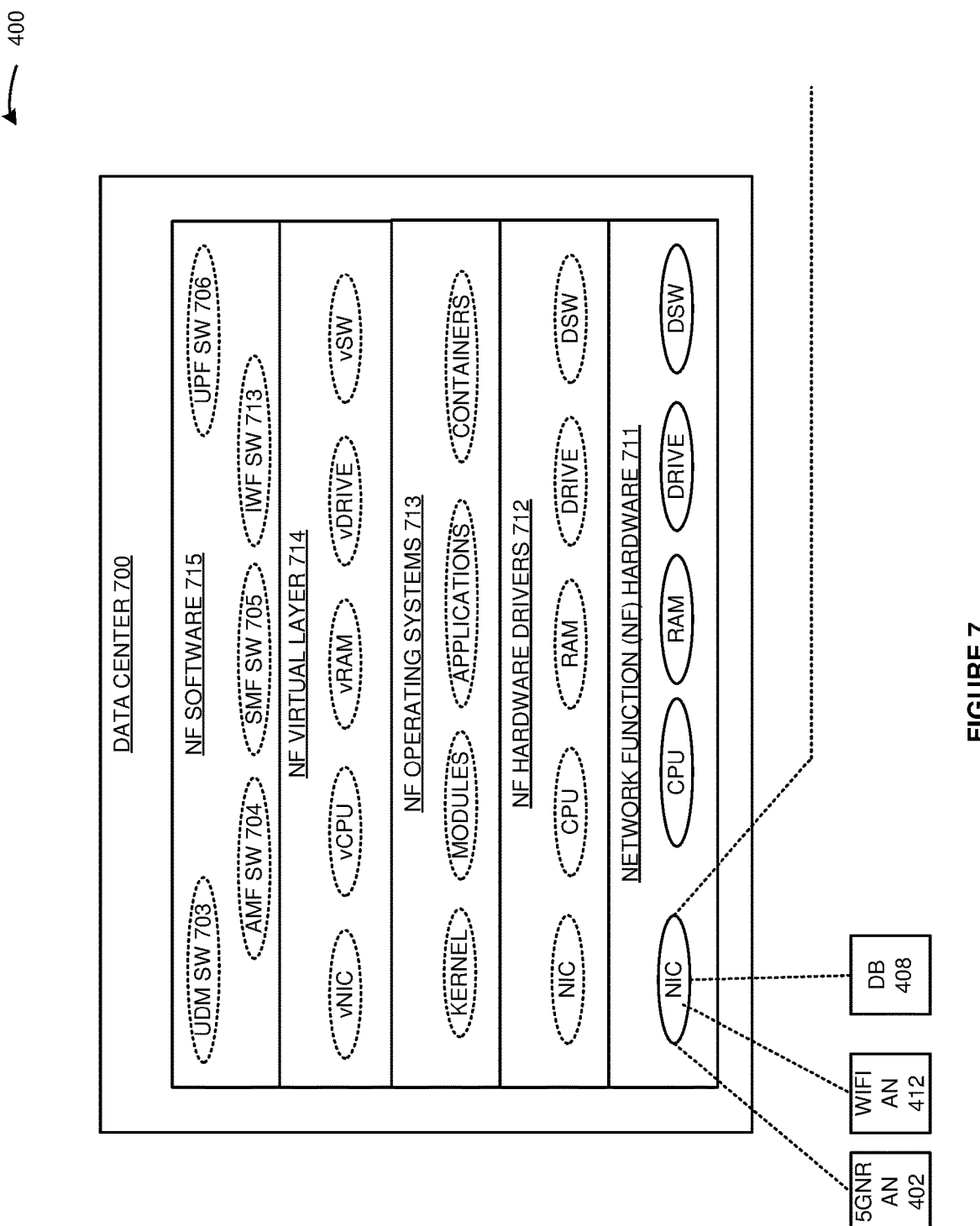
FIG. 7 illustrates an exemplary data center in the PLMN to handle an executable command.

FIG. 7 illustrates exemplary data center 700 in PLMN
400. Data center 700 comprises an example of communi-
cation system 103, although communication system 103
may differ. Network data center 700 comprises NF hardware
701, NF hardware drivers 702, NF operating systems 703,
NF virtual layer 704, and NF Software (SW) 705. NF
hardware 701 comprises Network Interface Cards (NICs),
CPU, RAM, Flash/Disk Drives (DRIVE), and Data
Switches (DSW). NF hardware drivers 702 comprise soft-
ware that is resident in the NIC, CPU, RAM, DRIVE, and
DSW. NF operating systems 703 comprise kernels, modules,
applications, and containers. NF virtual layer 704 comprises
vNIC, vCPU, vRAM, vDRIVE, and vSW. NF SW 705
comprises UDM SW 703, AMF SW 704, SMF SW 705,
UPF SW 706, and IWF SW 713. The NIC in NF hardware
701 are coupled to 5GNR AN 402, WIFI AN 412, database
408, and other external systems. NF hardware 701 executes
NF hardware drivers 702, NF operating systems 703, NF
virtual layer 704, and NF SW 705 to form and operate UDM
403, AMF 404, SMF 405, UPF 406, and IWF 413 as
described herein. Network data center 700 may be located at
a single site or be distributed across multiple geographic
locations.

Figure 8:
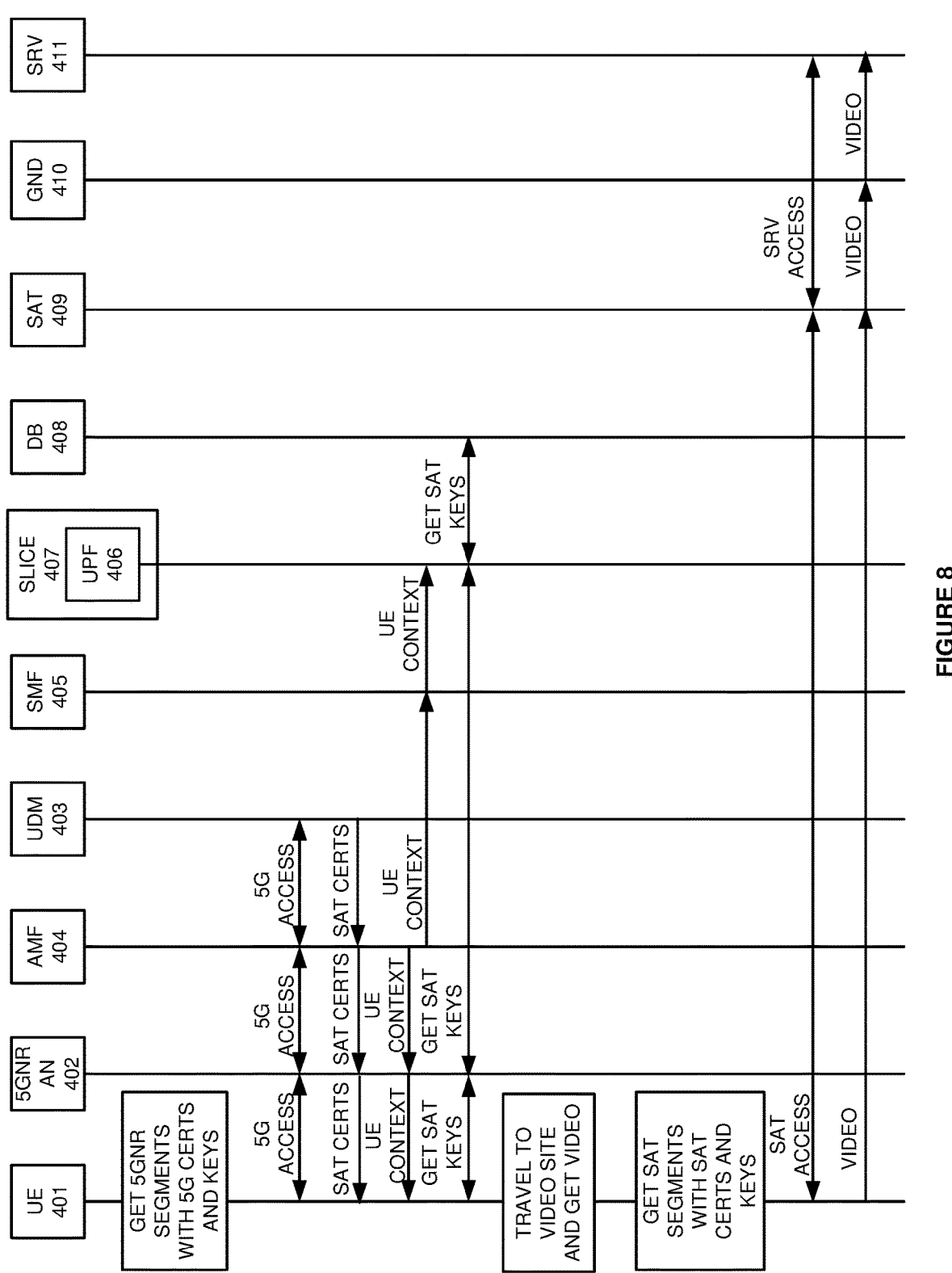
FIG. 8 illustrates an exemplary operation of the PLMN to handle an executable command.

FIG. 8 illustrates an exemplary operation of PLMN 400 to
handle an executable command. The operation may vary in
other examples. UE 401 identifies the need to get 5GNR
segments for the executable commands to access PLMN
400, network slice 407, and key database 408. To get these
command segments, UE 401 validates the individual 5G
digital certificates with their individual corresponding 5G
public keys. UE 401 will not access an individual 5GNR
code segment unless its individual digital certificate is
properly validated. UE 401 assembles the executable com-
mands from their retrieved code segments. UE 401 executes
the assembled executable commands. The executed com-
mands drive UE 401 to access 5GNR AN 402 and register
with AMF 404. AMF 404 retrieves UE context from UDM
403 to establish a data session between UE 401 and UPF 406
in network slice 407. Per the UE context, AMF 404 retrieves
digital certificates from UDM 403 that give UE 401 access
to satellite (SAT) 409 and video server (SRV) 411. AMF 404
and SMF 405 develop UE context for the data session over
slice 407. AMF 404 transfers this UE context to 5GNR AN
402 and UE 401 and during this context transfer, AMF 404
transfers the digital certificates for access to satellite 409 and
video server 411 to UE 401 over 5GNR AN 402. SMF 405
transfers UE context to UPF 406 in slice 407. UE 401 uses
the UE context to access key database (DB) 408 over 5GNR
AN 402 and UPF 406 in network slice 407. UE 401 retrieves
public keys from key database 408 that are required for
satellite and video server access. Although not shown for
clarity, UE 401 may get 5G segments to assemble executable
commands to access PLMN 400 over WIFI AN 412 and
IWF 413 in a similar manner to PLMN 400 access over
5GNR AN 402.

UE 401 then moves out of range of PLMN 400 take live
video at a remote site. UE 401 identifies the need to get the
command segments for the executable commands to access
satellite 409 and video server 411. To get these executable
commands, UE 401 validates the individual digital certifi-
cates from UDM 403 with their individual corresponding
public keys from key database 408. UE 401 will not access an individual code segment unless its digital certificate is properly validated. UE 401 assembles the executable commands from their code segments and executes the assembled executable commands. The executed commands drive UE 401 to access satellite 409 and register with video server 411 over ground station (GND) 410. In response to successful access using the code segments, UE 401 transfers the live video to video server 411 over satellite 409 and ground station 410.

Figure 9:
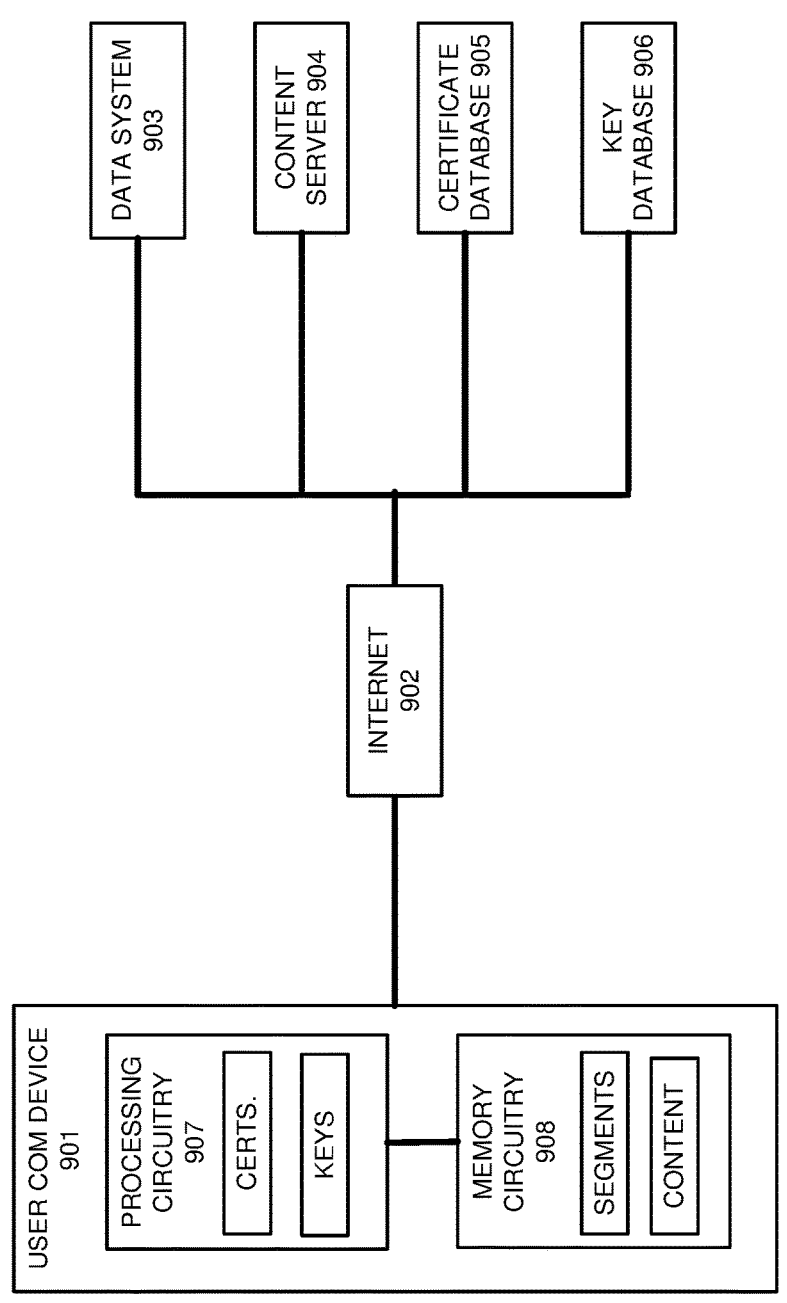
FIG. 9 illustrates an exemplary data communication system to handle an executable command.

FIG. 9 illustrates exemplary data communication system 900 to handle an executable command. Data communication system 900 comprises user communication device 901, internet 902, data system 903, content server 904, certificate database 905, and key database 906. User communication device 901 is an example of user communication device 100 and UE 401, although device 100 and UE 401 may differ. User communication device 901 comprises processing circuitry 907 and memory circuitry 908. Processing circuitry 907 is configured with certificates and keys to access certificate database 905 and key database 906 over internet 902. Memory circuitry 908 is configured with command segments for access to data system 903, content server 904, certificate database 905, key database 906, and the content in memory circuitry 908. Data system 903 could be a PLMN, NPN, enterprise network, or some other data communication system.

Processing circuitry 907 validates the individual certificates for access to certificate database 905 and key database 906 with the individual keys for access to certificate database 905 and key database 906. If these certificates are valid, processing circuitry 907 retrieves the code segments for access to certificate database 905 and key database 906 from memory circuitry 908. Processing circuitry 907 assembles the code segments into executable commands and executes the executable commands to access to certificate database 905 and key database 906 over internet 902.

Processing circuitry 907 obtains the digital certificates from certificate database 905 for access to data system 903, content server 904, and the content in memory circuitry 908. Processing circuitry 907 obtains the keys from key database 906 for access to data system 903, content server 904, and the content in memory circuitry 908. Processing circuitry 907 validates these individual certificates with their individual corresponding keys.

If the certificates for the code segments to access to data system 903 are valid, processing circuitry 907 retrieves the code segments for access to data system 903 from memory circuitry 908 and assembles the executable commands from the retrieved code segments. These executable commands may comprise interface scripts, access codes, and other instructions to access data system 903. Processing circuitry 907 executes the executable commands to access data system 903. For example, data system 903 may comprise a highly-secure enterprise NPN for an employee that operates user communication device 901.

If the certificates for the code segments to access content server 904 are valid, processing circuitry 907 retrieves the code segments for access to content server 904 from memory circuitry 908 and assembles the executable commands from the retrieved code segments. These executable commands may comprise interface scripts, access codes, and other instructions to access content server 904. Processing circuitry 907 executes the executable commands to access content server 904. For example, content server 904 may comprise a video-streaming service for a video subscriber that operates user communication device 901.

If the certificates for the code segments to the content in memory circuitry 908 are valid, processing circuitry 907 retrieves the code segments for access to the content in memory circuitry 908 from memory circuitry 908. Processing circuitry 907 assembles the executable commands from the retrieved code segments. These executable commands may comprise memory interfaces, access codes, and other instructions to access the content in memory circuitry 908. Processing circuitry 907 executes the executable commands to access the content in memory circuitry 908. For example, the content in memory circuitry 908 may comprise audio files for a music subscriber that operates user communication device 901.

Although processing circuitry 907 and memory circuitry 908 are depicted in user communication device 901, processing circuitry 907 and memory circuitry 908 could be deployed in another type of electronic device. Although user communication device 901 is used to access data system 903, content server 904, and the content in memory circuitry 908, user communication device (or another type of electronic device) could be used in a like manner to access other items.

The wireless communication system circuitry described above comprises computer hardware and software that form special-purpose circuitry to handle executable commands. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose circuitry to handle executable commands.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method to handle an executable command, the method comprising:

storing, by processing circuitry, individual code segments of the executable command in isolated memories, wherein the individual code segments comprise portions of the executable command and the isolated memories isolate the individual code segments from each other;

identifying, by the processing circuitry, individual digital certificates for the individual code segments, wherein the individual digital certificates for the individual code segments comprise individual data strings that are encrypted with individual private keys for the individual code segments;

validating, by the processing circuitry, the individual digital certificates for the individual code segments with individual cryptographic keys for the individual code segments, and in response, retrieving the individual code segments from the isolated memories, wherein the individual cryptographic keys for the individual code segments comprise individual public keys for the individual code segments;

assembling, by the processing circuitry, the executable command from the retrieved individual code segments; and executing, by the processing circuitry, the assembled executable command, wherein executing the assembled executable command comprises accessing digital content.

2. The method of claim 1 wherein executing the assembled executable command comprises accessing a data communication network to access the digital content.

3. The method of claim 1 wherein executing the assembled executable command comprises accessing a wireless network slice to access the digital content.

4. The method of claim 1 wherein executing the assembled executable command comprises accessing at least one of a Public Land Mobile Network (PLMN) and a Non-Public Network (NPN) to access the digital content.

5. The method of claim 1 wherein executing the assembled executable command comprises accessing a communication satellite to access the digital content.

6. A method of using an executable command, the method comprising transferring, by processing circuitry, transferring individual code segments of the executable command and storage instructions to memory circuitry, wherein the storage instructions direct the memory circuitry to store individual code segments of the executable command in different isolated memories, wherein the individual code segments comprise portions of the executable command and the different isolated memories isolate the individual code segments from each other;

receiving, by the memory circuitry, receiving the individual code segments of the executable command and the storage instructions, and in response, storing the individual code segments of the executable command in the different isolated memories;

identifying, by the processing circuitry, identifying individual digital certificates for the individual code segments and validating the individual digital certificates for the individual code segments with individual cryptographic keys for the individual code segments, and in response, transferring retrieval instructions to the memory circuitry, wherein the retrieval instructions direct the memory circuitry to transfer the individual code segments of the executable command from the different isolated memories, and wherein the individual digital certificates for the individual code segments comprise individual data strings that are encrypted with individual private keys for the individual code segments and the individual cryptographic keys for the individual code segments comprise individual public keys for the individual code segments;

receiving, by the memory circuitry, receiving the retrieval instructions from the processing circuitry, and in response, transferring the individual code segments of the executable command from the different isolated memories to the processing circuitry;

receiving, by the processing circuitry, receiving the individual code segments of the executable command from the memory circuitry and assembling the executable command from the received individual code segments; and executing, by the processing circuitry, executing the assembled executable command, wherein executing the assembled executable command comprises accessing digital content.

7. The method of claim 6 wherein the executing, by the processing circuitry, executing the assembled executable command comprises accessing a data communication network to access the digital content.

8. The method of claim 6 wherein executing, by the processing circuitry, executing the assembled executable command comprises accessing a wireless network slice to access the digital content.

9. The method of claim 6 wherein executing, by the processing circuitry, executing the assembled executable command comprises accessing at least one of a Public Land Mobile Network (PLMN) and a Non-Public Network (NPN) to access the digital content.

10. The method of claim 6 wherein executing, by the processing circuitry, executing the assembled executable command comprises accessing a communication satellite to access the digital content.

11. A user communication device to process an executable command, the user communication device comprising:

processing circuitry configured to transfer individual code segments of the executable command and storage instructions to memory circuitry, wherein the storage instructions direct the memory circuitry to store individual code segments of the executable command in different isolated memories, wherein the individual code segments comprise portions of the executable command and the different isolated memories isolate the individual code segments from each other;

the memory circuitry configured to receive the individual code segments of the executable command and the storage instructions, and in response, store the individual code segments of the executable command in the different isolated memories;

the processing circuitry further configured to identify individual digital certificates for the individual code segments and validate the individual digital certificates for the individual code segments with individual cryptographic keys for the individual code segments, and in response, to transfer retrieval instructions to the memory circuitry, wherein the retrieval instructions direct the memory circuitry to transfer the individual code segments of the executable command from the different isolated memories, and wherein the individual digital certificates for the individual code segments comprise individual data strings that are encrypted with individual private keys for the individual code segments and the individual cryptographic keys for the individual code segments comprise individual public keys for the individual code segments;

the memory circuitry further configured to receive the retrieval instructions from the processing circuitry, and in response, transfer the individual code segments of the executable command from the different isolated memories to the processing circuitry;

the processing circuitry further configured to receive the individual code segments of the executable command from the memory circuitry and assemble the executable command from the received individual code segments; and the processing circuitry further configured to execute the assembled executable command, wherein the assembled executable command is to access digital content.

12. The user communication device of claim 11 wherein the assembled executable command is to access a data communication network to access the digital content.

13. The user communication device of claim 11 wherein the assembled executable command is to access a wireless network slice to access the digital content.

14. The user communication device of claim 11 wherein the assembled executable command is to access at least one of a Public Land Mobile Network (PLMN) and a Non-Public Network (NPN) to access the digital content.

15. The user communication device of claim 11 wherein the assembled executable command is to access a communication satellite to access the digital content.

16. The method of claim 1 wherein executing the assembled executable command comprises accessing an enterprise network to access the digital content.

17. The method of claim 6 wherein executing, by the processing circuitry, executing the assembled executable command comprises accessing an enterprise network to access the digital content.

18. The method of claim 1 wherein the processing circuitry comprises a component of a Fifth Generation (5G) user device.

19. The method of claim 6 wherein the processing circuitry and the memory circuitry comprise components of a Fifth Generation (5G) user device.

20. The user communication device of claim 11 wherein the user communication device comprises a Fifth Generation (5G) user device.

* * * * *